United States Patent
Defoort et al.

(10) Patent No.: US 8,328,977 B2
(45) Date of Patent: Dec. 11, 2012

(54) METHOD FOR ENHANCING ADHERENCE OF CARBON FIBERS WITH RESPECT TO AN ORGANIC MATRIX

(75) Inventors: Brigitte Defoort, Saint Medard en Jalles (FR); Philippe Ponsaud, Paris (FR); Xavier Coqueret, Reims (FR)

(73) Assignees: Astrium SAS, Paris (FR); Universite des Sciences et Technologies de Lille, Villeneuve D'Ascq (FR)

( * ) Notice: Subject to any disclaimer, the term of this patent is extended or adjusted under 35 U.S.C. 154(b) by 890 days.

(21) Appl. No.: 12/065,983

(22) PCT Filed: Sep. 15, 2006

(86) PCT No.: PCT/EP2006/066418
§ 371 (c)(1),
(2), (4) Date: Mar. 6, 2008

(87) PCT Pub. No.: WO2007/031576
PCT Pub. Date: Mar. 22, 2007

(65) Prior Publication Data
US 2008/0255332 A1     Oct. 16, 2008

(30) Foreign Application Priority Data
Sep. 16, 2005 (FR) .................. 05 52791

(51) Int. Cl.
C09J 163/00 (2006.01)
C08F 24/00 (2006.01)
C08F 124/00 (2006.01)
C08F 224/00 (2006.01)

(52) U.S. Cl. ........................ 156/330; 526/273

(58) Field of Classification Search ............... 156/330; 526/273
See application file for complete search history.

(56) References Cited

U.S. PATENT DOCUMENTS
4,853,279 A * 8/1989 Shibata et al. ............... 525/115
6,368,712 B1 * 4/2002 Kobayashi et al. .......... 428/367

FOREIGN PATENT DOCUMENTS
EP 0 640 702 A1 3/1995
(Continued)

OTHER PUBLICATIONS
N. Tsubokawa, "Cationic Graft Polymerization of Polymers From Carbon Fiber Initiated by Acylium Perchlorate Groups Introduced Onto the Surface", Carbon, XP 000420951, vol. 31, No. 8, 1993, pp. 1257-1263.
(Continued)

Primary Examiner — Michael Orlando
(74) Attorney, Agent, or Firm — Oblon, Spivak, McClelland, Maier & Neustadt, L.L.P.

(57) ABSTRACT

The invention relates to a process for improving the adhesion of carbon fibres with regard to an organic matrix forming a composite material with these fibres, this composite material being obtained by bringing the fibres into contact with a resin which can be cured by chain polymerization and then polymerizing the resin, which process is characterized in that it comprises the grafting, to the surface of the fibres, before they are brought into contact with the resin, of groups capable of acting as chain transfer agents during the polymerization of said resin.

Fields of application: aeronautical, aerospatial, railway, ship building and automobile industries but also the armaments industry, the industry of sports and leisure articles, and the like.

18 Claims, 2 Drawing Sheets

FOREIGN PATENT DOCUMENTS

| | | |
|---|---|---|
| EP | 1 484 435 A2 | 12/2004 |
| FR | 2.129.906 | 11/1972 |
| GB | 1 382 402 | 1/1975 |
| GB | 1 385 352 | 2/1975 |
| JP | 3-76869 | 4/1991 |
| JP | 2002-327374 | 11/2002 |
| JP | 2004-183127 | 7/2004 |

OTHER PUBLICATIONS

Zhihong Wu, et al., "Grafting Isocyanate-Terminated Elastomers Onto the Surfaces of Carbon Fibers: Reaction of Isocyanate With Acidic Surface Functions", Carbon, XP 4022393, vol. 34, No. 1, 1996, pp. 59-67.

C. U. Pittman Jr, et al., "Reactivities of Amine Functions Grafted to Carbon Fiber Surfaces by Tetraethylenepentamine. Designing Interfacial Bonding", Carbon, XP 4083042, vol. 35, No. 7, 1997, pp. 929-943.

Sachio Yoshikawa, et al., "Grafting of polymers with controlled molecular weight onto inorganic fiber surface by termination of living polymer cation with amino group on the surface", Composite Interfaces, XP-000870982, vol. 6, No. 5, 1999, pp. 395-407.

* cited by examiner

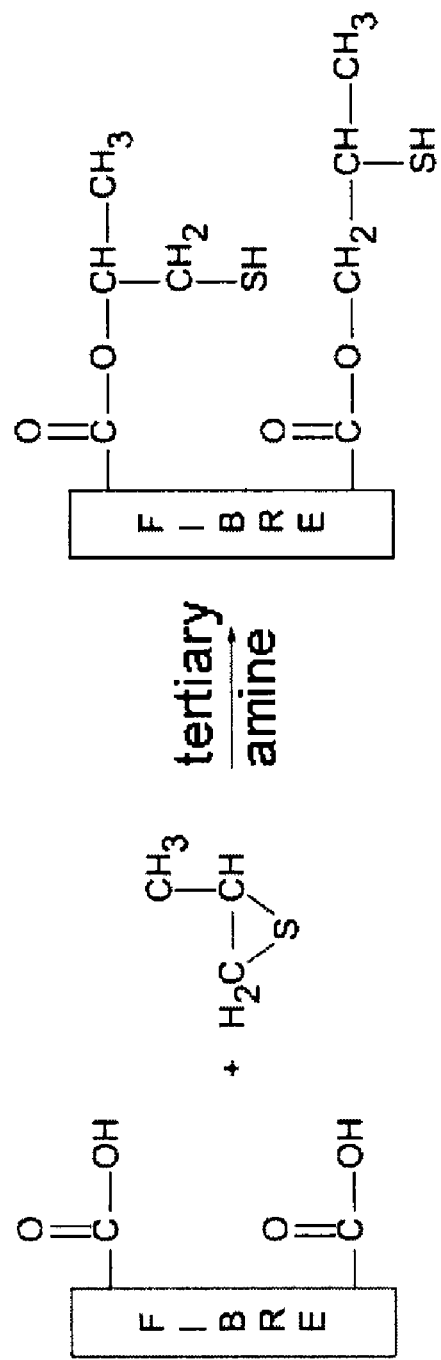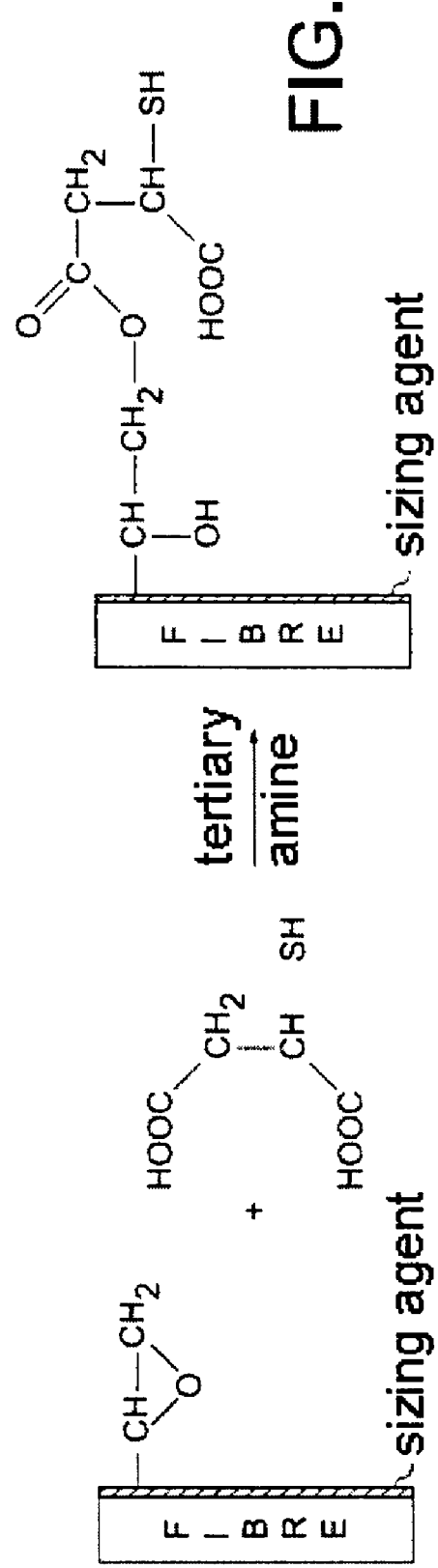
FIG. 1
FIG. 3

METHOD FOR ENHANCING ADHERENCE OF CARBON FIBERS WITH RESPECT TO AN ORGANIC MATRIX

TECHNICAL FIELD

The present invention relates to a process which makes it possible to improve the adhesion of carbon fibres with regard to an organic matrix forming, with these fibres, a composite material and resulting from the chain polymerization of a curable resin.

This process, which makes it possible to obtain composite materials with noteworthy properties of resistance to stresses, both transverse (that is to say, perpendicular to the direction of the carbon fibres) and longitudinal (that is to say, in the direction of the carbon fibres), is very particularly advantageous in the aeronautical, aerospatial, railway, ship building and automobile industries, whether in the production of structural components, engine components, passenger compartment components or bodywork components.

However, it can also be used in other types of industry, such as the armaments industry, for example in the production of components participating in the construction of missiles or of missile launch tubes, or that of sports and leisure articles, for example in the production of articles intended for water sports and for sports which involve sliding.

STATE OF THE PRIOR ART

Composite materials are heterogeneous materials which make it possible to make use of the exceptional mechanical properties of materials, the manufacture of which is only known in the form of fibres (and not in bulk form), by embedding them in a matrix formed of a cured organic polymer (or resin), which makes it possible to bond the fibres to one another, to distribute the stresses in the composite material and to protect the fibres against chemical attacks.

A necessary condition for the production of a high performance composite material is that the bonding between the fibres and the matrix of which it is composed is good. This is because, if the fibres/matrix bonding is inadequate, then a composite material is obtained with mediocre transverse mechanical properties (such as resistance to shearing) and thus with very limited possibilities of use, components made of composite materials generally being intended to operate under a state of three-directional stress.

Carbon is chemically rather unreactive and naturally exhibits a low adhesion with regard to polymer matrices. Consequently, manufacturers of carbon fibres have straightaway sought to adapt their fibres to the resins intended to be used as matrices by manufacturers of components made of composite materials.

Thus it is that the following have been proposed:

1) surface treatments which are all targeted at creating, at the surface of the fibres, functional groups capable of reacting with chemical functional groups carried by the resins; they are mainly electrolytic or chemical oxidation treatments (see, for example, JP-A-3076869 [1]) but other types of treatment have also been described, such as plasma heat treatments (see, for example, EP-A-1 484 435 [2]), electrolysis in an acidic or basic medium (EP-A-0 640 702 [3]) or the implantation of atoms of Si or B type (JP-B-2002327374 [4]);

2) the use of specific sizing agents, that is to say by the deposition, on the surface of the fibres, of products having the role of enhancing the compatibility of the fibres with regard to the resins, of facilitating their impregnation by the resins and of providing "attaching" between the fibres and the matrices formed by the polymerization of these resins; generally, the sizing agents used are polymers or copolymers with complex chemical structures, the choice of which is mainly guided by experience; and 3) the grafting to the surface of the fibres of an elastomeric phase (Wu et al., Carbon, 34, 59-67, 1996 [5]) or of polymers of polyester, vinyl polymer (in particular polystyrene) or polyacetal type (Tsubokawa, Carbon, 31, 1257-1263, 1993 [6]) capable, here again, of enhancing the compatibility of the fibres with regard to the resins.

It should be noted that sizing agents are also used on the carbon fibres for other objectives than that of improving the bonding thereof with an organic matrix, such as, for example, that of facilitating the handling thereof.

While the treatments mentioned above are generally relatively effective in the case of matrices obtained by thermal polymerization of resins (that is to say polymerization induced by heat), it turns out that they are not effective or insufficiently effective when the matrices are produced with resins, the polymerization of which is brought about by light radiation (visible or ultraviolet light) or ionizing radiation ($\beta$ or $\gamma$ radiation or X-rays).

This is because experience shows that the composites obtained with resins polymerized under radiation exhibit transverse mechanical performances which are markedly inferior to those of the better composites produced with resins polymerized by the thermal route, which is conventionally interpreted as the fact that the fibres/matrix bonding remains inadequate despite the treatments applied to the carbon fibres by the manufacturers thereof.

In point of fact, the polymerization of resins under radiation moreover exhibits a number of advantages with respect to the polymerization of resins by the thermal route, these advantages being related in particular to the possibility of operating without autoclaves and thus of more easily manufacturing composite components which are large in size or complex in structure and of obtaining much higher polymerization rates, which makes possible higher production rates for lower costs.

The Inventors thus set themselves the objective of providing a process which makes it possible to improve the adhesion of carbon fibres with regard to a polymer matrix in the case where this matrix is obtained by polymerization under radiation of a curable resin and more specifically of a resin which can be cured by chain polymerization since, in practice, the resins capable of polymerizing under radiation are resins, the polymerization of which takes place by a chain mechanism.

Furthermore, they set themselves the objective that this process be applicable to the greatest possible number of types of carbon fibres capable of being used in the manufacture of composite materials (long fibres, medium-length fibres, short fibres, oxidized fibres, sized fibres, and the like).

In addition, they set themselves the objective that the operating costs for this process be compatible with the use thereof on the industrial scale.

DESCRIPTION OF THE INVENTION

These objectives and yet others are achieved by the present invention, which provides a process for improving the adhesion of carbon fibres with regard to an organic matrix forming a composite material with these fibres, this composite material being obtained by bringing the fibres into contact with a resin which can be cured by chain polymerization and then polymerizing the resin, which process is characterized in that it comprises the grafting, to the surface of the fibres, before they are brought into contact with the resin, of groups capable of acting as chain transfer agents during the polymerization of said resin.

The carbon fibres as obtained by conventional processes for the pyrolysis of polyacrylonitrile (PAN), rayon, viscose, pitch and other oil residues are each composed of a multitude of monofilaments which can be more or less bonded to one another according to the treatments to which these fibres were subjected during the manufacture thereof.

For this reason, in that which precedes and in that which follows, the term "surface of the fibres" is understood to mean both the surface of the monofilaments themselves and the surface of assemblages resulting from the bonding of a plurality of monofilaments to one another. In the same way, the term "surface of a fibre" is understood to mean both the surface of a monofilament and that of an assemblage resulting from the bonding of several monofilaments to one another.

Furthermore, in that which precedes and in that which follows, the term "polymerization" should be understood as comprising not only the formation of polymer chains by bonding of monomers or prepolymers to one another but also the formation of a three-dimensional network by the establishment of bonds between these polymer chains, which is commonly known as crosslinking.

Thus, according to the invention, it is by grafting, to the surface of the carbon fibres, before the latter participate in the process for the manufacture of the composite material, organic groups capable of subsequently acting as chain transfer agents during the polymerization of the resin intended to form the organic matrix of the composite material that the adhesion of these fibres with regard to this matrix is enhanced.

In the current state of their studies, the Inventors believe that this increase in adhesion would be related to the fact that the groups thus grafted to the surface of the fibres will be converted, during the polymerization of the resin, to active centres (that is to say to radicals or to ions, depending upon whether the chain polymerization is of radical type or of ionic type) by reaction with growing polymer chains and that these active centres will be capable of initiating the formation of new polymer chains starting from the surface of the fibres, which would then be covalently bonded to this surface from the moment of their creation.

In other words, the polymerization of the resin would trigger the activation of the groups grafted to the surface of the fibres to give active centres, this activation being accompanied both by control of the polymerization and by the creation of covalent bonds between the fibres and the organic matrix.

This presumed mechanism can be illustrated diagrammatically in the following way:

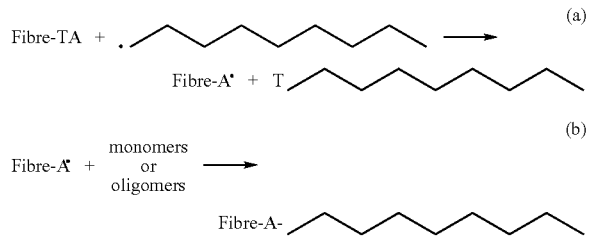

where:
  TA represents a group acting as chain transfer agent,

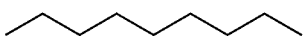

represents a polymer chain,
  stage (a) illustrates the conversion of this group to an active centre, and
  stage (b) illustrates the formation of a new polymer chain starting from the surface of the fibre.

In accordance with the invention, the groups which are grafted to the surface of the carbon fibres and which are preferably all identical can be chosen from the many groups known for being capable of acting as chain transfer agents in a chain polymerization, it being understood that the selection will preferably be made of that or those which make(s) it possible to obtain a fibre/matrix bond which is the most satisfactory possible, in view of the curable resin which has to be used and/or the conditions under which the latter has to be polymerized.

In order to do this, it is entirely possible to evaluate the effect of different groups on the adhesion of carbon fibres with regard to a specific organic matrix and/or for specific polymerization conditions, for example by subjecting fibres on which one of these groups will have been grafted beforehand to a test conventionally used to assess the mechanical properties of a fibre/matrix interface, such as, for example, a loosening test of the type of that described in Example 1 below, and by comparing the results obtained for each grafted group.

Mention may in particular be made, as groups capable of acting as chain transfer agents in a chain polymerization, of carbon-based groups comprising an —I, —Br, —Cl, —F, —SH, —OH, —NH—, —NH$_2$, —PH—, —PH$_2$ or =S functional group and also carbon-based groups which are devoid of a heteroatom but which can give rise to radical transfer, such as, for example, optionally substituted allyl or benzyl —CH groups.

It turns out that, in the context of their studies, the Inventors have found that the grafting of carbon-based groups comprising a thiol functional group makes it possible to obtain a particularly significant improvement in the adhesion of carbon fibres, in particular with regard to matrices obtained by polymerization of epoxy acrylate resins under ionizing radiation. Consequently, carbon-based groups comprising a thiol functional group are those which it is preferable to graft in the context of the present invention.

Furthermore, in accordance with the invention, the grafting to the surface of the carbon fibres of the groups capable of acting as chain transfer agents is generally carried out by reacting functional groups present on this surface with a compound which generates, during this reaction, a group capable of acting as chain transfer agent or which comprises such a group, the choice of this compound being conditioned by the type or types of functional groups present at the surface of the fibres, which themselves depend on the treatment or treatments to which the fibres have been subjected during or on conclusion of the manufacture thereof.

Thus, for example, carbon fibres which have been subjected to an electrolytic or chemical oxidation carry, in principle, oxygen-based groups, such as hydroxyl, ketone, carboxylate or ether groups, while carbon fibres which have been subjected to sizing carry, for their part, generally epoxide groups.

It should be noted that, if it is not possible to obtain details on the type or types of functional groups carried by carbon fibres from the manufacturer, it is possible to assess the surface condition of these fibres by electron spectroscopy for chemical analysis (ESCA), also known under the name of X-ray photoelectron spectroscopy (XPS).

According to a first preferred embodiment of the process according to the invention, the grafting to the surface of the carbon fibres of the groups capable of acting as chain transfer agents is carried out by reacting functional groups present at the surface of these fibres with a cyclic organic compound which, by ring opening, becomes covalently bonded to the functional groups of the fibres and simultaneously generates a group capable of acting as chain transfer agent.

Thus, for example, in the case where it is desired to graft carbon-based groups comprising a thiol functional group to the surface of oxidized carbon fibres which comprise in particular carboxyl groups, this grafting is carried out by reacting these carboxyl groups with an episulphide which, by ring opening, becomes covalently bonded to a carboxyl functional group and simultaneously generates a group comprising a thiol functional group.

The episulphide is, for example, propylene sulphide, ethylene sulphide, cyclohexene sulphide, epithiodecane, epithiododecane or 7-thiabicyclo-[4.1.0]heptane and the reaction is advantageously carried out under hot conditions (for example, at a temperature of the order of 100° C.) in the presence of a catalyst, preferably a tertiary amine, such as triethylamine.

Furthermore, it is advantageously followed by one or more operations of washing the fibres and then by one or more operations of drying said fibres, which can be carried out according to procedures conventionally employed in the matter of washing and drying fibres and in particular carbon fibres.

According to another preferred embodiment of the process according to the invention, the grafting to the surface of the carbon fibres of the groups capable of acting as chain transfer agents is carried out by reacting functional groups present on the surface of these fibres with an organic compound which comprises a chemical functional group capable of reacting with the said functional groups and a group capable of acting as chain transfer agent.

Thus, for example, in the case where it is desired to graft carbon-based groups comprising a thiol functional group to the surface of the carbon fibres, this grafting is carried out by reacting the functional groups present at the surface of these fibres with an organic compound having a chemical functional group which is chosen as a function of the type or types of functional groups present at the surface of the fibres and a group comprising a thiol functional group.

For sized fibres rich in epoxide groups, the chemical functional group is advantageously a carboxyl or phenol functional group and the reaction is advantageously carried out under hot conditions (for example, at a temperature of 150° C.) under vacuum and in the presence of a catalyst, preferably a tertiary amine, such as dimethylaminoethyl methacrylate.

An organic compound having both a carboxyl functional group and a group comprising a thiol functional group is, for example, thiomalic acid, thioglycolic acid, thiolactic acid, 3-mercaptopropionic acid, 11-mercaptoundecanoic acid, 16-mercapto-hexadecanoic acid, 2-mercaptonicotinic acid, 6-mercaptonicotinic acid or 2-mercapto-4-methyl-5-thiazolacetic acid, while a compound having both a phenol functional group and a group comprising a thiol functional group is, for example, 2-mercaptophenol, 3-mercaptophenol, 4-mercaptophenol or 4-thiouracil.

In any case, it is within the normal competence of a person skilled in the art of the field of the coupling of chemical functional groups to know how to determine, according to the functional groups present at the surface of the carbon fibres which he intends to use, what are the compounds suitable for allowing him to graft, to the surface of these fibres, the groups of his choice and to fix the conditions under which the grafting has to be carried out in order to be effective, in particular as regards the carbon fibres/reactant(s)/catalyst(s) relative proportions which have to be used, and also the temperature and pressure parameters necessary for the satisfactory progression of this grafting.

In accordance with the invention, the curable resin can be chosen from any resin capable of curing by a chain polymerization mechanism, whether under the effect of heat or under the effect of light or ionizing radiation, this being because the Inventors have found, in the context of their studies, that the process according to the invention is effective both in the case of a thermosetting resin and of a photo- or radiation-curable resin.

However, for the reasons set out above, the resin is preferably chosen from resins which can be polymerized under radiation and in particular from resins of multiacrylates type, such as epoxy acrylates, novolac acrylates and polyurethane acrylates, bismaleimide resins and epoxide resins, epoxy acrylate resins being particularly preferred in the case where the composite material is intended for space or aeronautical applications.

Once the grafting to the surface of the fibres of the groups capable of acting as chain transfer agents has been carried out, the carbon fibres can either be used immediately in the manufacture of components made of composite materials or can be stored for the purpose of subsequent use or also be packaged for the purpose of their delivery to manufacturers of components made of composite materials. This is because the process according to the invention can be employed both by the manufacturers of carbon fibres and by the users thereof.

Another subject-matter of the invention is a process for the manufacture of a component made of composite material comprising carbon fibres and an organic matrix, which process comprises bringing the fibres into contact with a resin which can be cured by chain polymerization and then polymerizing the resin and is characterized in that it furthermore comprises the implementation of a process as described above before the fibres are brought into contact with said resin.

It is obvious that the manufacture of this component made of composite material can be carried out according to any technique known to a person skilled in the art of composite materials, such as, for example, simultaneous spray moulding, vacuum moulding, moulding by low pressure injection of resin (Resin Transfer Moulding (RTM)), low pressure "wet route" cold press moulding, compound injection moulding (Bulk Moulding Compound (BMC)), moulding by compression of preimpregnated mats (Sheet Moulding Compound (SMC)), filament winding moulding, centrifugal moulding or pultrusion moulding.

Other characteristics and advantages of the process for improving the adhesion of carbon fibres with regard to an organic matrix in accordance with the invention will become more clearly apparent on reading the remainder of the description which follows, which relates to examples of the implementation of this process and which refers to the appended drawings.

Of course, these examples are given solely by way of illustration of the subject-matter of the invention and do not under any circumstances constitute a limitation on this subject-matter.

BRIEF DESCRIPTION OF THE DRAWINGS

FIG. 1 illustrates the reaction between two carboxyl functional groups situated on the surface of an oxidized and nonsized carbon fibre and propylene sulphide in the presence of a tertiary amine and shows the chemical structures of the two types of groups comprising a thiol functional group which are assumed to become attached to the surface of the fibre during this reaction.

FIG. 3 illustrates the reaction between an epoxide functional group situated at the surface of a sized carbon fibre and thiomalic acid in the presence of a tertiary amine.

DETAILED DESCRIPTION OF SPECIFIC EMBODIMENTS

Example 1

Figure 2A:
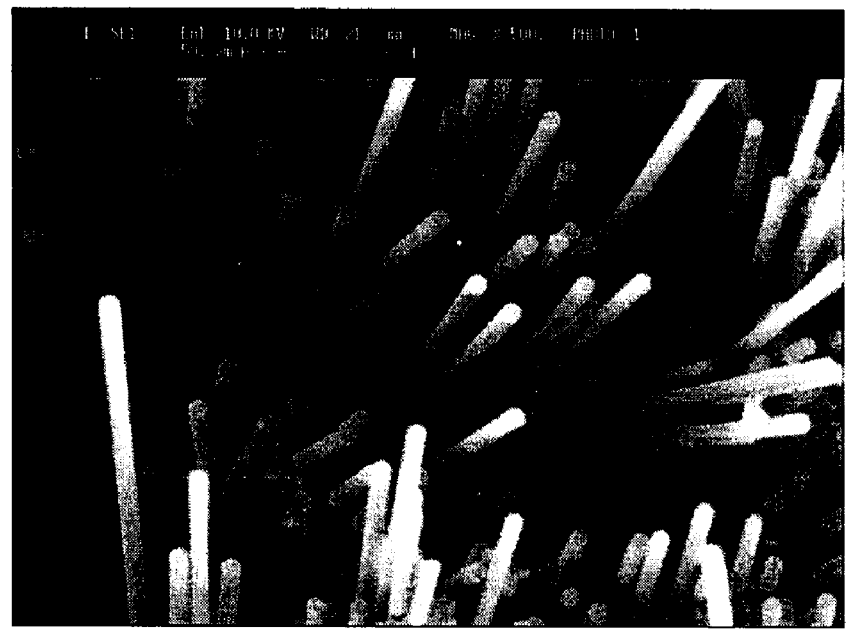
FIG. 2A shows a negative taken with a scanning electron microscope (SEM), at a magnification of 500×, of a split in a composite material produced from an epoxy acrylate resin and oxidized and nonsized carbon fibres.

This example relates to the grafting of groups comprising a thiol functional group to the surface of carbon fibres which have been subjected to electrolytic oxidation but which have not been subjected to any sizing.

These fibres originate from Tenax, which markets them under the reference IMS5001.

Their main chemical characteristics are collated in Table 1 below.

TABLE 1

| Elemental atomic ratios | C | O | N |
|---|---|---|---|
| | 83% | 15% | 2% |
| Nature and distribution of the oxygen-based groups (as % of the total carbon) | —COR 9.5% | —C=O 3.1% | —COOH 6.3% |

The grafting of the groups comprising a thiol functional group to the surface of the fibres is carried out by reacting the carboxyl functional groups present on this surface with propylene sulphide in an organic solvent and in the presence of triethylamine according to the reaction scheme represented in FIG. 1.

The solvent used is toluene, this being because its low polarity makes it possible to limit the occurrence of undesirable side reactions.

These various compounds are used at the level of:
200 mmol of propylene sulphide,
30 mmol of triethylamine,
30 ml of toluene,
per 55 mg of carbon fibres.

The grafting reaction is carried out in a confined environment, without addition of pressure, at 100° C. and for 5 hours.

In practice, use is made of a steel reactor, of cylindrical shape, which is provided with a stirrer and a heater band which makes it possible to bring the reaction medium to and maintain it at the desired temperature. Furthermore, in order to prevent the fibres from becoming entangled around the stirrer, they are placed in the reactor by being enclosed beforehand in a nonwoven polypropylene bag which is permeable but resistant to toluene.

After reacting for 5 hours, the fibres are washed twice in an acetic acid/toluene (10/90 v/v) solution, in order to remove the triethylamine, and then washed five times in pure toluene, each washing operation being carried out in a beaker, with stirring and for 30 minutes.

The yield of the grafting reaction is assessed by subjecting the fibres to a Soxhlet extraction with water for 5 hours, so as to remove all the impurities liable to be present at the surface of the fibres, and by then carrying out an ESCA/XPS analysis of this surface. This analysis shows the proportion of the sulphide atoms present at the surface of the fibres as 3%.

The effect of the grafting of groups comprising a thiol functional group on the adhesion of the fibres with regard to a matrix obtained by polymerization of an epoxy acrylate resin, in the case in point the resin EB600 from UCB Chemicals, is for its part assessed by a loosening test.

In brief, this loosening test consists in immersing the end of a monofilament in a microdrop of resin, in bringing about the polymerization of the resin at ambient temperature and under an electron beam and in then exerting a tensile stress on the other end of the monofilament, at the rate of 1 mm/min, while keeping the drop of resin stationary.

The tensile force is recorded over time. The maximum tensile force recorded is regarded as the force necessary for the loosening of the monofilament from the cured resin drop.

The InterFacial Shear Strength (IFSS) is determined using the following formula:

$$\tau = \frac{\sigma fd}{2L} = \frac{F}{2\pi rL}$$

in which:
d represents the diameter of the monofilament (in metre),
r represents the radius of the monofilament (in metre),
L represents the length of monofilament initially inserted into the drop of resin (in metre),
F represents the force necessary for the loosening of the monofilament from the cured resin drop (in newton), and $$\sigma f = \frac{F}{\pi r^2} \text{ (in newton/m}^2\text{)}.$$

The loosening test is carried out on several monofilaments of IMS5001 fibres which have been grafted with groups comprising a thiol functional group and several monofilaments of IMS5001 fibres which have not been grafted, so as to be meaningful.

The results show that the IFSS is 59±3 MPa in the case where the IMS5001 fibres were grafted to groups comprising a thiol functional group, whereas it is only 49±4 MPa in the case where the IMS5001 fibres were not grafted.

The IFSS is thus increased by 20% by the presence of thiol functional groups on the surface of the fibres.

The positive effect of the grafting of the groups comprising a thiol functional group on the fibres/matrix adhesion is furthermore confirmed by an SEM analysis of splits in composite materials comprising a matrix obtained by polymerization of EB600 resin and IMS5001 fibres which are or are not grafted with groups comprising a thiol functional group.

These composite materials are produced in the form of unidirectional sheets by:
- impregnation of the fibres with the resin (degree of impregnation 40% by weight);
- manufacture of unidirectional plies (12 plies) by winding the impregnated fibres around a flat mandrel;
- assembling the plies by drape moulding and compacting;
- polymerization under vacuum at ambient temperature by 4 passes at 25 kGy.

Figure 2B:
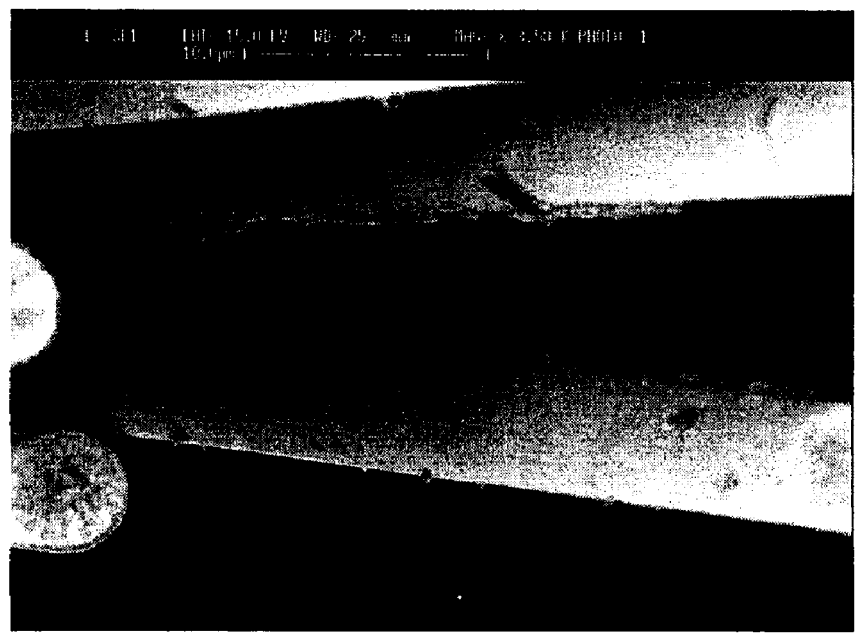
FIG. 2B shows a negative taken with an SEM, at a magnification of 3500×, of a split in a composite material produced using the same epoxy acrylate resin and the same carbon fibres as those present in the composite material of FIG. 2A but after having grafted groups comprising a thiol functional group to the surface of these fibres by the reaction illustrated in FIG. 1.

As is shown in FIG. 2B, which corresponds to a negative taken at a magnification of 3500× of a split in a composite material including IMS5001 fibres grafted with groups comprising a thiol functional group, these fibres exhibit resin residues attached at their surface which are not found on the fibres of a composite material including IMS5001 fibres not grafted with groups comprising a thiol functional group (FIG. 2A) and which testify to better bonding between the fibres and the epoxy acrylate matrix.

Example 2:

This example for its part relates to the grafting of the group comprising a thiol functional group to the surface of sized carbon fibres.

These fibres originate from Toray, which markets them under the reference T800H40.

They exhibit a sizing agent of epoxide type and more specifically of bisphenol A diglycidyl ether (BADGE) type, this being because these fibres are intended to be used mainly with epoxide resins.

The groups comprising a thiol functional group are grafted to the surface of fibres by reacting the epoxide functional groups present on this surface with thiomalic acid in the presence of dimethylaminoethyl methacrylate according to the reaction scheme represented in FIG. 3. The solvent used is methyl ethyl ketone.

To do this, the fibres, in the form of a bobbin, are impregnated with a mixture of thiomalic acid and of amine, in a molar ratio of the amine functional groups to the carboxyl functional groups of 0.5%, diluted to 0.7% by weight in methyl ethyl ketone, and then the impregnated bobbin is subjected to a heat treatment at 150° C. for 30 minutes, after a rise in temperature over 45 minutes.

The effect of the grafting of the groups comprising a thiol functional group on the adhesion of the fibres with regard to a matrix obtained by polymerization of an epoxy acrylate resin, in a case in point the EB600 resin, is assessed by subjecting composite materials, produced according to a protocol analogous to that described in Example 1 from this resin and T800H40 fibres grafted or not grafted with groups comprising a thiol functional group, to a transverse bending test according to Airbus Standard IGC.04.06.245 or Standard EN 2582.

The results show that the bending σ2 is 70 MPa in the case where the T800H40 fibres were grafted with groups comprising a thiol functional group, whereas it was only 25 MPa in the case where the T800H40 fibres were not grafted.

Documents Cited
[1] JP-A-3076869
[2] EP-A-1 484 435
[3] EP-A-0 640 702
[4] JP-B-2002327374
[5] Wu et al., Carbon, 34, 59-67, 1996
[6] Tsubokawa, Carbon, 31, 1257-1263, 1993

The invention claimed is:

1. A process for improving the adhesion of carbon fibers to an organic matrix made of a cured resin, said organic matrix forming a composite material with the carbon fibers, comprising:
grafting chemical groups to the surface of the carbon fibers which are selected from chemical groups acting as chain transfer agents during a chain transfer polymerization of a resin curable by chain transfer polymerization;
bringing the carbon fibers into contact with the curable resin;
inducing the chain transfer polymerization of the curable resin to obtain the cured resin, thereby producing the organic matrix and forming the composite material; and
wherein the chemical groups which are grafted to the surface of the carbon fibers act as chain transfer agents during the chain transfer polymerization of the curable resin and thereby improve the adhesion of the carbon fibers to the organic matrix.

2. The process of claim 1, wherein the chemical groups which are grafted to the surface of the carbon fibers are chosen from carbon-based groups comprising an —I, —Br, —Cl, —F, —SH, —OH, —NH—, —NH$_2$, —PH—, —PH$_2$ or =S functional group.

3. The process of claim 2, wherein the chemical groups which are grafted to the surface of the carbon fibers are carbon-based groups comprising a thiol (—SH) functional group.

4. The process of claim 1, wherein the grafting is carried out by reacting functional groups present at the surface of the carbon fibers with an organic compound which, by ring opening, becomes covalently bonded to the functional groups of the fibers.

5. The process of claim 4, wherein the functional groups present at the surface of the carbon fibers are carboxyl groups and the organic compound is an episulfide which generates a group comprising a thiol functional group.

6. The process of claim 5, wherein the episulfide is chosen from propylene sulfide, ethylene sulfide, cyclohexene sulfide, epithiodecane, epithiododecane and 7-thiabicyclo-[4.1.0]heptane.

7. The process of claim 5, wherein the reaction of the carboxyl groups present at the surface of the carbon fibers with the episulfide is carried out under hot conditions and in the presence of a tertiary amine catalyst.

8. The process of claim 5, wherein the reaction of the carboxyl groups present at the surface of the carbon fibers with the episulfide is followed by one or more operations of washing the fibers and then by one or more operations of drying the fibers.

9. The process of claim 3, wherein the grafting is carried out by reacting functional groups present on the surface of these fibers with an organic compound which comprises a chemical functional group capable of reacting with said functional groups and a group acting as a chain transfer agent.

10. The process of claim 9, wherein the organic compound has, as a group acting as chain transfer agent, a group comprising a thiol functional group.

11. The process of claim 10, wherein the functional groups present at the surface of the carbon fibers are epoxide functional groups and the organic compound has, as the chemical functional group, a carboxyl functional group or a phenol functional group.

12. The process of claim 11, wherein the reaction of the epoxide groups present at the surface of the carbon fibers with the organic compound having a carboxyl or phenol functional group is carried out under hot conditions, under vacuum, and in the presence of a tertiary amine catalyst.

13. The process of claim 11, wherein the organic compound is chosen from thiomalic acid, thioglycolic acid, thiolactic acid, 3-mercaptopropionic acid, 11-mercaptoundecanoic acid, 16-mercapto-hexadecanoic acid, 2-mercaptonicotinic acid, 6-mercaptonicotinic acid and 2-mercapto-4-methyl-5-thiazolacetic acid.

14. The process of claim 1, wherein the resin is chosen from resins which can be polymerized under light or ionizing radiation.

15. The process of claim 1, wherein the resin is chosen from epoxy acrylate resins, novolac acrylates, polyurethane acrylates, bismaleimide resins and epoxide resins.

16. The process of claim 15, wherein the resin is an epoxy acrylate resin.

17. A process for manufacturing a composite material comprising carbon fibers and an organic matrix made of a cured resin, comprising:
grafting chemical groups to the surface of the carbon fibers which are selected from chemical groups acting as chain transfer agents during a chain transfer polymerization of a resin curable by chain transfer polymerization;
bringing the carbon fibers into contact with the curable resin;
inducing the chain transfer polymerization of the curable resin to obtain the cured resin, thereby producing the organic matrix and forming the composite material;
and wherein the chemical groups which are grafted to the surface of the carbon fibers act as chain transfer agents during the chain transfer polymerization of the curable resin and thereby improve the adhesion of the carbon fibers to the organic matrix.

18. A process for improving the adhesion of carbon fibers to an organic matrix made of a cured resin, said organic matrix forming a composite material with the carbon fibers, comprising:
grafting chemical groups to the surface of the carbon fibers which are selected from chemical groups acting as chain transfer agents during a chain transfer polymerization of a resin curable by chain transfer polymerization, said chemical groups being carbon-based groups comprising an —I, —Br, —Cl, —F, —SH, —OH, —NH—, —NH2, —PH—, —PH2 or =SH functional group;
bringing the carbon fibers into contact with the curable resin;
inducing the chain transfer polymerization of the curable resin to obtain the cured resin, thereby producing the organic matrix and forming the composite material;
and wherein the chemical groups which are grafted to the surface of the carbon fibers act as chain transfer agents during the chain transfer polymerization of the curable resin and thereby improve the adhesion of the carbon fibers to the organic matrix.

* * * * *